Nov. 14, 1961     C. W. CHILLSON     3,008,340
MECHANICAL SERVO WITH RECIPROCATING DRIVE
Filed July 5, 1960     3 Sheets-Sheet 1
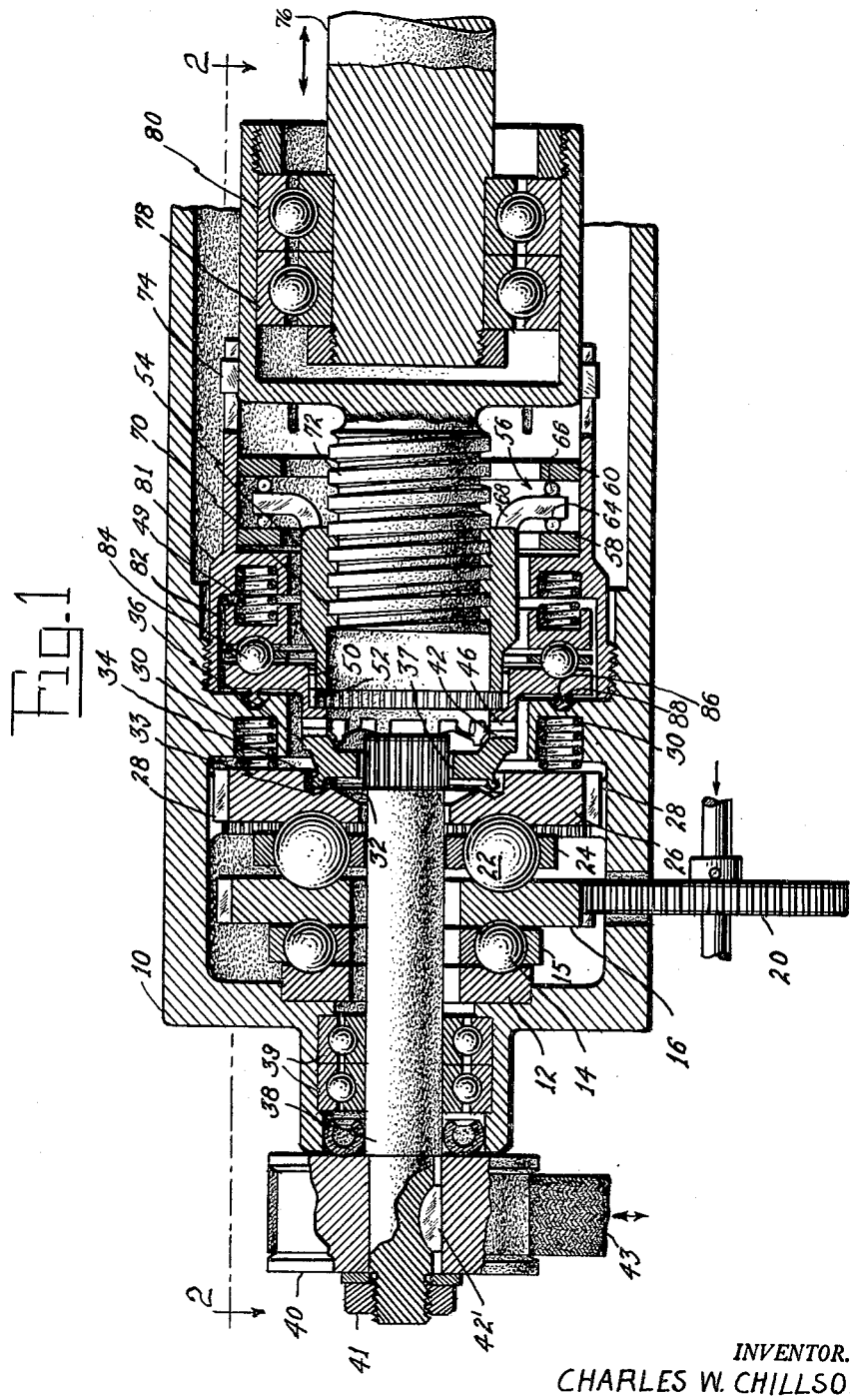
INVENTOR.
CHARLES W. CHILLSON
BY
William V. Els
his ATTORNEY.

Nov. 14, 1961   C. W. CHILLSON   3,008,340
MECHANICAL SERVO WITH RECIPROCATING DRIVE
Filed July 5, 1960   3 Sheets-Sheet 2
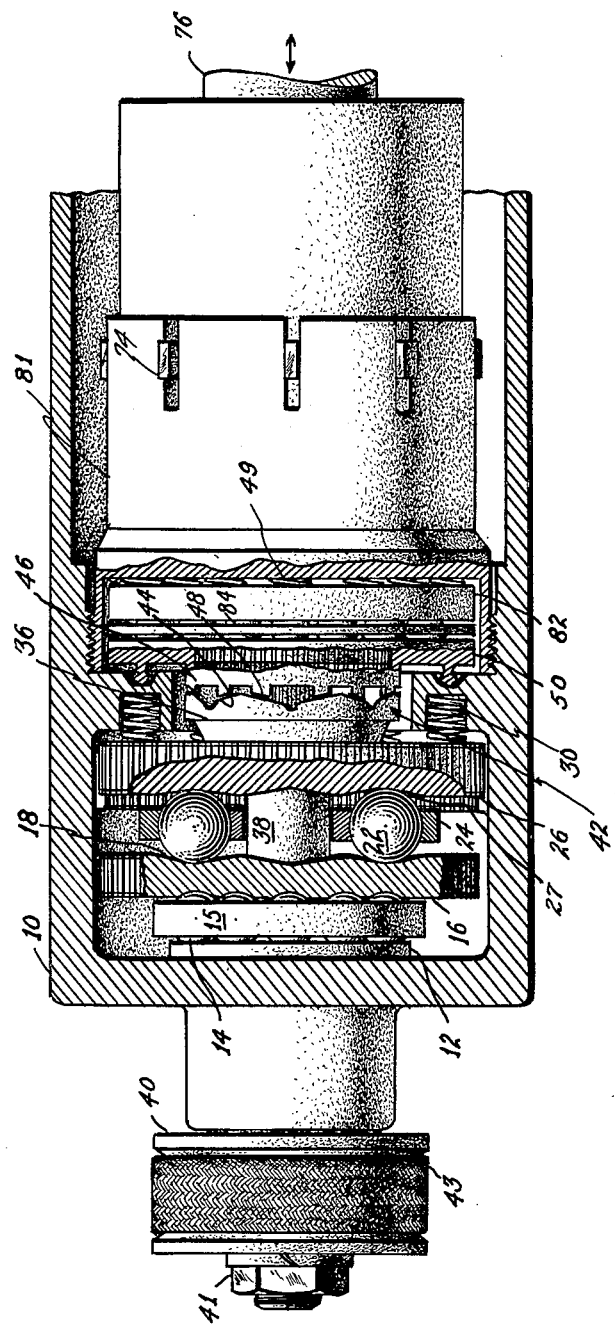
INVENTOR.
CHARLES W. CHILLSON
BY William V. Ebs
his ATTORNEY.

Nov. 14, 1961 C. W. CHILLSON 3,008,340
MECHANICAL SERVO WITH RECIPROCATING DRIVE
Filed July 5, 1960 3 Sheets-Sheet 3
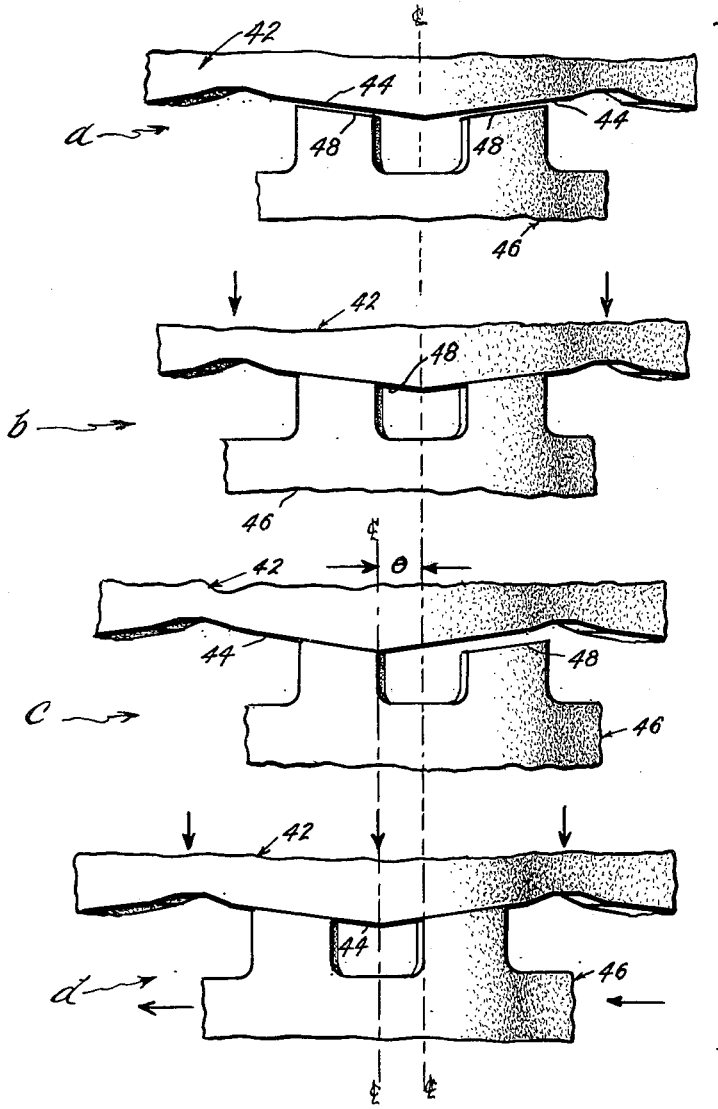
INVENTOR.
CHARLES W. CHILLSON
BY
his ATTORNEY.

United States Patent Office 3,008,340
Patented Nov. 14, 1961

3,008,340
MECHANICAL SERVO WITH RECIPROCATING DRIVE
Charles W. Chillson, Packanack Lake, N.J., assignor to Curtiss-Wright Corporation, a corporation of Delaware
Filed July 5, 1960, Ser. No. 40,658
12 Claims. (Cl. 74—424.8)

My invention relates to screw and nut mechanisms. More particularly the invention is directed to an all mechanical servomechanism or force amplifier wherein powerful forces and motions from a continuously operating source may be precisely controlled by minute control forces.

The device of the invention comprises continuously reciprocable drive means, a control member requiring very light effort to move it, a power transmitting element rotatable by the action of the driving means in accordance with positioning of the control member, and a member movable linearly in accordance with rotation of the rotatable element. Means are provided for preventing reciprocation of the rotatable element and linearly movable member by the reciprocable drive means. Preferably, the power transmitting element is a nut, and the linearly movable element is preferably a screw engaged and translated by the nut. It will be appreciated, however, that various machine elements having the same functional effect might be substituted for these parts, as for example wedges, cams and followers and ratchet devices.

The device of the invention is particularly useful as a servo-actuator for auxiliary mechanism in powerplants where mechanical power is available in close proximity to the auxiliary mechanism requiring controlled power. Ship steering engines, turret actuators, and powerplant auxiliaries of many sorts are suitable environments in which the invention may be used constructively. Powerplants include those for marine, stationary, mobile and aircraft systems.

The prime object of the invention is to provide a rugged and dependable all mechanical servomechanism of simple and unique construction, having a selectively positionable output member which, although driven by reciprocating mechanism is free of oscillatory motion due to the reciprocating drive in the absence of an input signal to the device.

Other objects and advantages of the invention will become apparent during a reading of the specification taken in conjunction with the accompanying drawings in which FIG. 1 is a vertical sectional view taken through the device of the invention, FIG. 2 is a view taken substantially along the line 2—2 of FIG. 1; and FIG. 3 is a somewhat diagrammatic enlarged view showing control elements of the device in different positions assumed during their operating sequence.

Referring to the drawings, reference character 10 designates the frame or housing of the device. One end of the housing supports a stationary race 12 on which the balls 14 roll. The balls 14, which are housed in cage 15, support a rotatable race 16 having a waved annular upper face 18. During the operation of the device the race 16 is driven rotationally as by a power input gear 20 which is rotated steadily from a suitable power source such as a powerplant not shown, with which the mechanism is associated. Balls 22, held in spaced relationship by retainer 24, roll on the waved race 16 and also bear on a non-rotating annular race 26 which is restrained from rotation by a key connection 28 with the housing 10. The lower face of race 26 may be waved as at 27 or not as desired. When waved, the use of additional mechanism (not shown) to coordinate the action of the balls 22 with the valleys and peaks of the race waves to secure full reciprocation of the race 26 may be desirable. Race 26 is biased to the left as viewed in FIGS. 1 and 2 of the drawing by springs 30. However, rotation of race 16 causes the balls 22 to roll up and down the waves of the engaging races with the result that the race 26 is caused to move to the right and left cyclically. An inclined face 32 on the race 26 includes an annular groove 33. As the race 26 moves to the right a projecting annulus 34 on a control input ring 36 is forced into the groove 33.

The ring 36 is splined at 37 to an input shaft 38 which extends beyond the housing of the device. The shaft is rotatably supported in the bearings 39. As shown, shaft 38 is provided with a pulley 40 which is secured thereon by nut 41 and keyed to the shaft at 42' such that the shaft 38 might be readily turned by means of a belt 43 on the pulley. Any other suitable means might be provided for turning shaft 38, the purpose of which is to rotationally position ring 36 and thereby control the output of the device. The manner in which the position of ring 36 controls the output of the mechanism will shortly become apparent.

On one side of ring 36 is a cam 42 comprising a plurality of planar surfaces 44 angularly disposed in an annulus. A lug cam 46, including a plurality of planar surfaces 48, is located opposite the cam 42. The surfaces 48 on cam 46 are parallel to the surfaces 44 on cam 42 as shown. In the contracted condition of the reciprocating mechanism, that is when the balls 22 are in the valleys of the engaging wavy cams, race 26 is disposed in its most leftward position and the planar surfaces 44 are free of the surfaces 48 of cam 46 as shown in FIG. 3a. Assuming no input signal to the device, the cam surfaces 48 of lug cam 46 are centrally disposed with respect to the surfaces 44 of cam 42 in the manner of FIG. 3a. Upon expansion of the reciprocating mechanism race 26 moves the ring 36 to the right, as viewed in FIGS. 1 and 2 (downwardly as viewed in FIG. 3) and the surfaces 44 of cam 42 are caused to forcibly engage the surfaces 48 of cam 46 (see FIG. 3b). The cam 46 is moved axially to some extent against the biasing force of springs 49, but this has no effect on the output of the device which is responsive only to rotational movements of the cam 46.

The cam 42 may be moved rotationally in response to an input signal during periods of contraction of the reciprocating mechanism, that is when the relative positions of cams 42 and 46 are as shown in FIG. 3a. This is accomplished through pulley 40 and the shaft 38. Only a very small amount of torque is required to move the ring 36, including cam 42, during contracted periods of the reciprocating mechanism, inasmuch as there is no restraining force acting on the cam at such time. Assuming the cam 42 is moved to the left, as viewed in FIG. 3, in response to an input signal, alternate planar surfaces of cam 42 are caused to contact and slide along alternate planar surfaces of the cam 46 (FIG. 3c). As the reciprocating mechanism expands race 26 frictionally grips the projecting annulus 34 of the ring 36 in groove 33 to thereby prevent further rotation of the ring. The cam 42 is moved axially as viewed in FIGS. 1 and 2 (downwardly as viewed in FIG. 3) against the surfaces 48 on cam 46 with the result that cam 46 is caused to rotate to the left (FIG. 3d). Intermittent rotational movements of cam 46 are produced in this manner for as long as the input signal persists. The cams 42 and 46 function in a similar manner when cam 42 is moved in the other direction, that is to the right, in response to an input signal. As the cam 42 is moved to the right, cam 46 is caused to rotate intermittently, for the duration of the input signal, to the right as viewed in FIG. 3.

The cam 46 is an integral part of race 50 which is keyed at 52 to a nut 54 such that rotational movement of cam 46 is imparted to the nut. The nut 54 is supported in a thrust bearing 56 and cannot move axially. Such thrust bearing comprises the races 58 and 60 integral with housing structure 10 and balls 64 and 66 which respectively engage said races and flanged portion 68 of the nut. The nut 54 is threaded at 70 upon screw rod 72 and rotation of the nut causes the screw rod to be moved axially in one direction or another in accordance with rotation of the nut as determined by the input signal to the device. Rotation of the screw rod is prevented by a key connection 74 between the screw rod and housing attached structure. Axial movement is imparted to an output rod 76 by the screw rod 72 which connects with the rod 76 through thrust bearings 78 and 80. The screw rod 72 and output rod 76 are moved axially and intermittently in a straight line for as long as an input signal to the device persists. The thrust bearings 78 and 80 render the rod 76 rotationally adjustable.

Assuming the absence of an input signal to ring 36, race 50 is moved axially by expansion of the reciprocating mechanism, but any such movement is taken up by compression of springs 49. No axial reciprocating motion is imparted to nut 54 or to rods 74 and 76 due to the action of balls 22 on the engaging race waves.

As shown, opposite ends of springs 49 bear against housing attached structure 81 and an axially movable race 82. Balls 84 are disposed in bearing tracks between the races 50 and 82. During contraction of the reciprocating mechanism springs 49, acting through race 82, balls 84 and race 50 force projecting annulus 86 on race 50 into housing groove 88, such that race 50 is frictionally restrained from rotation. This prevents rotation of the nut 54 and cam 46 during contraction of the reciprocating mechanism due to axially loading of output rod 76. During expansion, the annulus 86 is moved outwardly with respect to groove 88 such that the race 50 and nut 76 may be turned in response to an input signal as described hereinbefore to actuate the output rod and move a load.

With the described construction wherein rotation of the nut 54 depends upon the wedging action of the inclined surfaces of cams 42 and 46, it is essential, if the coefficients of friction between such cam surfaces, and between the nut 54 and screw 72 are substantially the same, that the acute angles which the inclined surfaces of cams 42 and 46 make with the transverse plane of their annuli be greater than the pitch angles of the engaging nut 54 and screw 72 in order for the nut 54 to be rotated by expansion of the reciprocating mechanism. The desired result may also be achieved by reducing frictional force between control input ring 36 and race 50 as by the substitution of wavy annular cams with balls therebetween for cams 42 and 46 as shown, for example, in Patent No. 2,928,287 issued March 15, 1960 to Charles W. Chillson and assigned to the same assignee as the present invention.

The device as described is obviously subject to various changes and modifications which may be made by those skilled in the art without departing from the spirit and scope of the invention. The appended claims are intended to cover all such changes and modifications.

I claim:

1. A mechanical servo comprising continuously reciprocable driving means, a control member intermittently actuable by the driving means, means for positioning the control member between periods of actuation, an element rotatable by the action of said driving means according to the positioning of the control member, means for preventing translational movement of said element, and another element movable linearly in accordance with the rotation of said rotatable element.

2. The combination as defined in claim 1 wherein said rotatable element is a nut, and the linearly movable element is a screw.

3. The combination as defined in claim 2 including means for preventing any rotational movement of the screw.

4. A mechanical servo comprising reciprocating means; control input means including a control member intermittently actuable in one direction by the reciprocating means, said control input means being positionable in another direction between periods of actuation of the control member; a nut rotatable by the action of the reciprocating means according to the positioning of the control member; means for preventing translational movement of the nut; and a screw movable linearly in accordance with the rotation of the nut.

5. A mechanical servo comprising continuously reciprocable driving means, a control member intermittently actuable by the driving means, means for positioning the control member between periods of actuation, a nut rotatable by the action of said driving means according to the positioning of the control member, a thrust bearing for preventing translational movement of the nut, and a screw movable linearly in accordance with the rotation of the nuts.

6. The combination as defined in claim 5 including means for preventing the screw from moving in a rotational sense.

7. A mechanical servo comprising reciprocating means; control input means including a control cam intermittently actuable in one direction by the reciprocating means, said control cam being positionable in another direction between periods of actuation; another cam engageable by said control cam, and rotatable according to the positioning of the control cam upon actuation of the control cam by the reciprocating means; a nut rotatable by said another cam; means for preventing translation of the nut; and a screw movable linearly in accordance with the rotation of the nut.

8. The combination as defined in claim 7 wherein said cams include mutually engageable planar surfaces disposed at corresponding angles in annuli, and the angles at which the planar surfaces are disposed in the respective annuli exceeds the pitch angle of said screw.

9. The combination as defined in claim 7 including braking means to prevent rotation of said another cam between periods of actuation of the control cam.

10. The combination as defined in claim 7 wherein the means for preventing translation of the nut is a thrust bearing.

11. The combination as defined in claim 10 including means for preventing movement of the screw in a rotational sense.

12. A mechanical servo comprising reciprocating means; control input means including a wavy annular control cam intermittently actuable in one direction by the reciprocating means, said control cam being positionable in another direction between periods of actuation; another wavy annular cam and balls between the two said wavy annular cams; said another wavy annular cam being rotatable according to the positioning of the control cam of the reciprocating means; a nut rotatable by said another cam; means for preventing translation of the nut; and a screw movable linearly in accordance with rotation of the nut.

References Cited in the file of this patent

UNITED STATES PATENTS

| | | |
|---|---|---|
| 2,151,094 | Fiorentino | Mar. 21, 1939 |
| 2,583,775 | Hyde | Jan. 29, 1952 |
| 2,928,289 | Maroth | Mar. 15, 1960 |